United States Patent
Monier et al.

(10) Patent No.: US 9,866,104 B2
(45) Date of Patent: Jan. 9, 2018

(54) CIRCUITS AND METHODS FOR OPERATING A SWITCHING REGULATOR

(71) Applicant: GAZELLE SEMICONDUCTOR, INC., Redwood City, CA (US)

(72) Inventors: Nicolas Stephane Monier, San Francisco, CA (US); David Christian Gerard Tournatory, Redwood City, CA (US)

(73) Assignee: Gazelle Semiconductor, Inc., Sunnyvale, CA (US)

( * ) Notice: Subject to any disclaimer, the term of this patent is extended or adjusted under 35 U.S.C. 154(b) by 722 days.

(21) Appl. No.: 14/315,768

(22) Filed: Jun. 26, 2014

(65) Prior Publication Data

US 2015/0145331 A1 May 28, 2015

Related U.S. Application Data

(60) Provisional application No. 61/909,041, filed on Nov. 26, 2013.

(51) Int. Cl.
| | |
|---|---|
| *H02M 1/14* | (2006.01) |
| *H02M 3/156* | (2006.01) |
| *H02M 3/158* | (2006.01) |
| *H02M 7/538* | (2007.01) |
| *H02M 1/00* | (2006.01) |

(52) U.S. Cl.
CPC ............ *H02M 1/14* (2013.01); *H02M 3/156* (2013.01); *H02M 3/1588* (2013.01); *H02M 7/538* (2013.01); *H02M 2001/008* (2013.01); *Y02B 70/1466* (2013.01); *Y10T 307/367* (2015.04)

(58) Field of Classification Search
CPC ...... H02M 1/14; H02M 3/156; H02M 3/1588; H02M 7/538; H02M 2001/008; Y02B 70/1466; Y10T 307/367
USPC .......................................................... 307/26
See application file for complete search history.

(56) References Cited

U.S. PATENT DOCUMENTS

| | | |
|---|---|---|
| 4,673,889 A | 6/1987 | Cini et al. |
| 5,418,707 A | 5/1995 | Shimer et al. |
| 5,570,276 A | 10/1996 | Cuk et al. |

(Continued)

FOREIGN PATENT DOCUMENTS

| | | |
|---|---|---|
| EP | 1172924 A3 | 2/2002 |
| EP | 2002558 B1 | 9/2011 |

(Continued)

OTHER PUBLICATIONS

Josh Wibben et al, "A High-Efficiency DC-DC Converter Using 2 nH Integrated Inductors", IEEE Journal of Solid-State Circuits, Jul. 7, 2007, pp. 844-854, vol. 43, No. 4.

(Continued)

*Primary Examiner* — Jared Fureman
*Assistant Examiner* — Michael Warmflash

(57) ABSTRACT

The present disclosure includes circuits and methods for controlling the operation of a switching regulator. Closing and opening high side and low side switches may be controlled so that an inductor current may be used to charge and/or discharge an intermediate switching node when both switches are open. In one embodiment, delays between a low-to-high transition and a high-to-low transition of an AC stage may be cycled over multiple periods of a DC stage.

19 Claims, 10 Drawing Sheets

(56) References Cited

U.S. PATENT DOCUMENTS

| | | | |
|---|---|---|---|
| 5,581,451 A | 12/1996 | Ochiai | |
| 5,592,071 A | 1/1997 | Brown | |
| 5,615,093 A | 3/1997 | Nalbant | |
| 5,770,940 A | 6/1998 | Goder | |
| 5,929,692 A | 7/1999 | Carsten | |
| 6,396,137 B1 | 5/2002 | Klughart | |
| 6,674,274 B2 * | 1/2004 | Hobrecht | H02J 1/102 323/268 |
| 6,894,464 B2 | 5/2005 | Zhang | |
| 6,987,380 B1 | 1/2006 | Lee | |
| 7,250,746 B2 | 7/2007 | Oswald et al. | |
| 7,432,614 B2 | 10/2008 | Ma et al. | |
| 7,486,060 B1 | 2/2009 | Bennett | |
| 7,499,682 B2 | 3/2009 | Rozenblit et al. | |
| 7,538,535 B2 | 5/2009 | McDonald et al. | |
| 7,730,340 B2 | 6/2010 | Hu et al. | |
| 8,085,020 B1 | 12/2011 | Bennett | |
| 8,248,152 B2 | 8/2012 | Dennard et al. | |
| 2005/0007086 A1 * | 1/2005 | Morimoto | H02M 3/1584 323/282 |
| 2005/0200404 A1 | 9/2005 | Bernardon | |
| 2007/0195876 A1 * | 8/2007 | Prodic | H03K 5/135 375/238 |
| 2008/0197827 A1 * | 8/2008 | Wrathall | H02M 3/1588 323/282 |
| 2011/0204862 A1 | 8/2011 | Prodic et al. | |
| 2013/0200849 A1 | 8/2013 | Crebier et al. | |
| 2013/0214752 A1 | 8/2013 | Tournatory | |
| 2013/0214858 A1 | 8/2013 | Tournatory et al. | |
| 2014/0015500 A1 * | 1/2014 | Babazadeh | H02M 3/1584 323/272 |
| 2014/0049235 A1 | 2/2014 | Li et al. | |

FOREIGN PATENT DOCUMENTS

| | | |
|---|---|---|
| EP | 2493060 A1 | 8/2012 |
| WO | 2009067591 A2 | 5/2009 |
| WO | 2011128849 A2 | 10/2011 |
| WO | 2013122782 A1 | 8/2013 |

OTHER PUBLICATIONS

International Search Report (from a corresponding foreign application), PCT/US2014/45812, dated Dec. 5, 2014.
International Search Report (from a corresponding foreign application), PCT/US2013/078355, dated Apr. 8, 2014.
International Search Report and Written Opinion—PCT/US2014/65917—ISA/US—dated Feb. 11, 2015.

* cited by examiner

CIRCUITS AND METHODS FOR OPERATING A SWITCHING REGULATOR

CROSS-REFERENCE TO RELATED APPLICATIONS

This application claims priority to U.S. Provisional Patent Application Ser. No. 61/909,041, filed Nov. 26, 2013 the contents of which are hereby incorporated by reference herein in its entirety.

BACKGROUND

The present disclosure relates to electronic systems and methods, and in particular, to circuits and methods for operating a switching regulator.

Switching regulators often include high side and low side switches. The manner in which these switches are operated can impact the efficiency of the regulator. For example, optimum utilization of a synchronous output stage of a voltage regulator can depend on the ability to adjust the power FET gate signals. Efficiency losses can result from overly long deadtimes (time where both FETs are off) due to the body diode conduction and body-diode reverse recovery. Alternatively, if deadtimes are too short (or negative), simultaneous conduction of the two power FETs may also reduce efficiency.

SUMMARY

The present disclosure includes circuits and methods for operating a switching regulator. The present disclosure includes circuits and methods for controlling the operation of a switching regulator. Closing and opening high side and low side switches may be controlled so that an inductor current may be used to charge and/or discharge an intermediate switching node when both switches are open. In one embodiment, delays between a low-to-high transition and a high-to-low transition of an AC stage may be cycled over multiple periods of a DC stage.

The following detailed description and accompanying drawings provide a better understanding of the nature and advantages of the present disclosure.

DETAILED DESCRIPTION

The present disclosure pertains to switching regulators. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
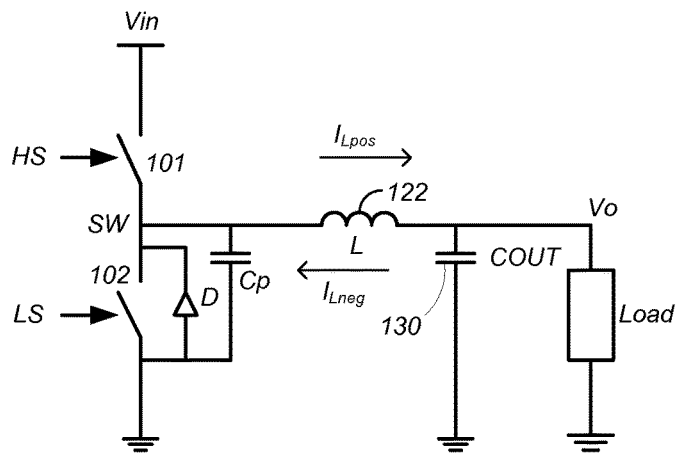
FIG. 1 illustrates charging and discharging parasitic capacitance associated with a switching node in a switching regulator.

Embodiments of the present disclosure include circuits and methods for operating a switching regulator. FIG. 1 illustrates charging and discharging capacitance in a switching regulator. Switching regulator 100 includes a high side switch 101 between a first power supply voltage Vin and an intermediate node SW and a low side switch 102 between node SW and a second power supply voltage (here, ground). Switches 101 and 102 may be implemented using MOS transistors, for example. Node SW may have an associated parasitic capacitance Cp due to the source or drain capacitance of the MOS devices. Additionally, a diode D may be formed (e.g., in the body of an MOS device) between ground and node SW. Diode D may contribute to the parasitic capacitance of node SW.

During operation, high side drive signal HS may open and close switch 101 and low side drive signal LS may open and close switch 102. Typically, when switch 101 is closed, Vin is coupled to node SW to increase the current in inductor L 122. During the time period, switch 102 is open. Similarly, when switch 102 is closed, node SW is coupled to ground to decrease the current in inductor L 122. During the time period, switch 101 is open.

Figure 2:
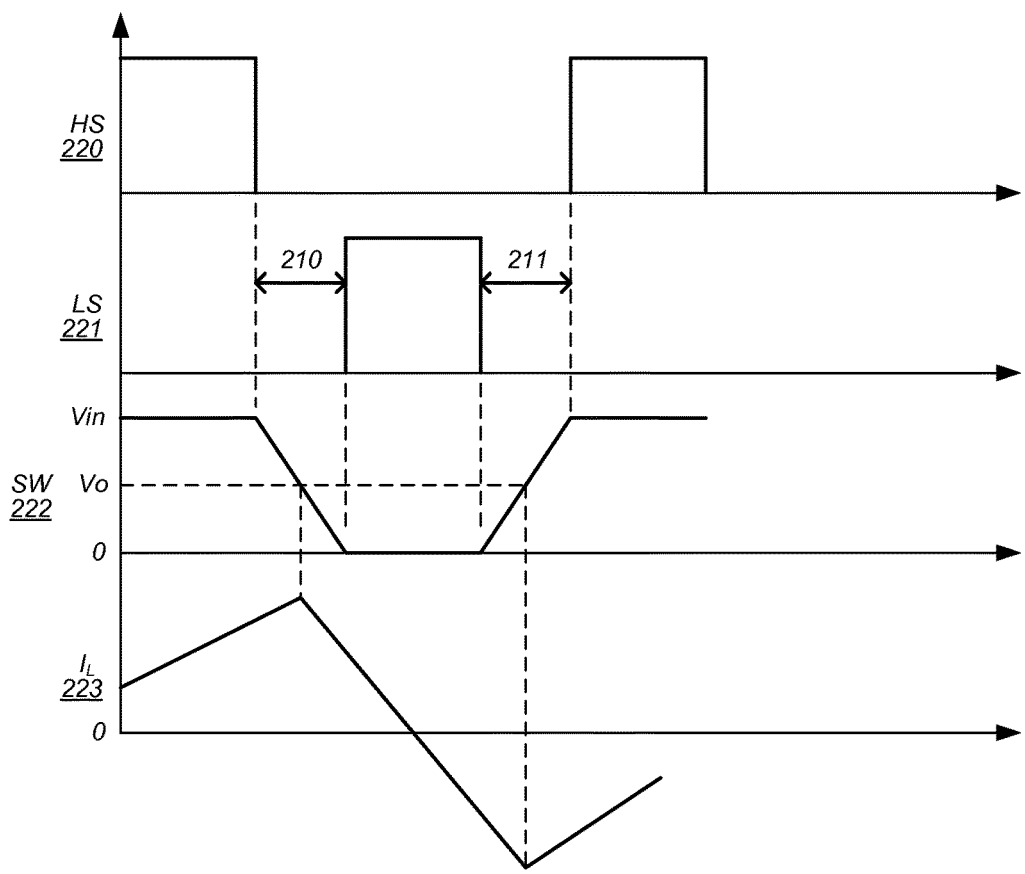
FIG. 2 illustrates waveforms of a switching regulator according to one embodiment.

FIG. 2 illustrates waveforms of a switching regulator according to one embodiment. FIG. 2 shows a high side switch signal HS high (switch 101 closed), as shown at 220, while the low side switch signal LS is low (switch 102 open), as shown at 221. When LS is high (switch 102 closed), HS is low (switch 101 open). FIG. 2 further illustrates time periods 210 and 211, referred to herein as "deadtimes." A time 210 denotes a time period between a state when switch 101 is closed (and switch 102 is open) and a state when switch 102 is closed (and switch 101 is open). Similarly, time 211 denotes a time period between a state when switch 102 is closed (and switch 101 is open) and a state when switch 101 is closed (and switch 102 is open). These time periods can impact system performance. For example, if these deadtimes are too short (or negative), both switches may be closed at the same time such that Vin is directly coupled to ground, causing a "shoot through" current effect that results in wasted power.

FIGS. 1 and 2 illustrate another issue pertaining to deadtime. As illustrated in FIG. 2, when HS is high, node SW is at Vin as shown at 222, and the current in the inductor increases as shown at 223. When HS goes low, the voltage on node SW will begin to drop from the level of Vin as a positive inductor current Ilpos discharges SW. If the deadtime is too long, the positive inductor current may discharge capacitance Cp and turn on diode D, causing the voltage on SW to drop below ground. If the voltage on SW drops below ground, then Cp (including the junction capacitance of diode D) must be charged through ground when LS goes high, which further contributes to wasted power.

Embodiments of the present disclosure include using a positive inductor current to discharge capacitance of an intermediate node SW during a high to low transition (i.e., a transition turning switch 101 off and switch 102 on) or using a negative inductor current to charge capacitance of the intermediate node SW during a low to high transition (i.e., a transition switch 102 off and switch 101 on). Embodiments of the present disclosure may set a time period between a high side switch turning off and a low side switch turning on such that the positive current during the time period discharges an intermediate node SW to a voltage where the voltage across a low side switch is zero volts (e.g., Vsw=gnd). Similarly, embodiments of the present disclosure may set a time period between a low side switch turning off and the high side switch turning on such that the negative current during the time period charges an intermediate node SW to a voltage where the voltage across a high side switch is zero volts (e.g., Vsw=Vin). Turning on the low side switch and/or the high side switch when the voltage across the switch (e.g., a source to drain voltage) is zero volts may reduce lost power and improves the efficiency of the switching regulator, for example.

FIG. 2 illustrates the operation of an example switching regulator. When HS is high and LS is low, node SW is at Vin and the inductor current is positive and increasing. When HS goes low, switch 101 opens, and the voltage on SW decreases as positive inductor current discharges node SW and Cp. The current in the inductor begins to decrease after the voltage on SW decreases below the output voltage Vo. In one embodiment, circuitry is configured to drive LS high when SW is near zero volts (e.g., before diode D becomes forward biased and begins to conduct current). Similarly, When LS is high and HS is low, node SW is at ground (0v) and the inductor current is negative and decreasing. When LS goes low, switch 102 opens, and the voltage on SW starts increasing as negative inductor current flows into node SW and Cp. The current in the inductor begins to increase after the voltage on SW increases above the output voltage Vo. In one embodiment, circuitry is configured to drive HS high when SW is near Vin. It is to be understood that the above techniques may be used individually in different circuits, where a switching regulator may produce a time period 210 to discharge SW as described above but not charge SW, and where another switching regulator may produce a time period 211 to charge SW as described above but not discharge SW. In one example embodiment described below, a switching regulator may include circuits for producing both time periods 210 and 211 to charge and discharge SW and improve efficiency of the system, for example.

Figure 3:
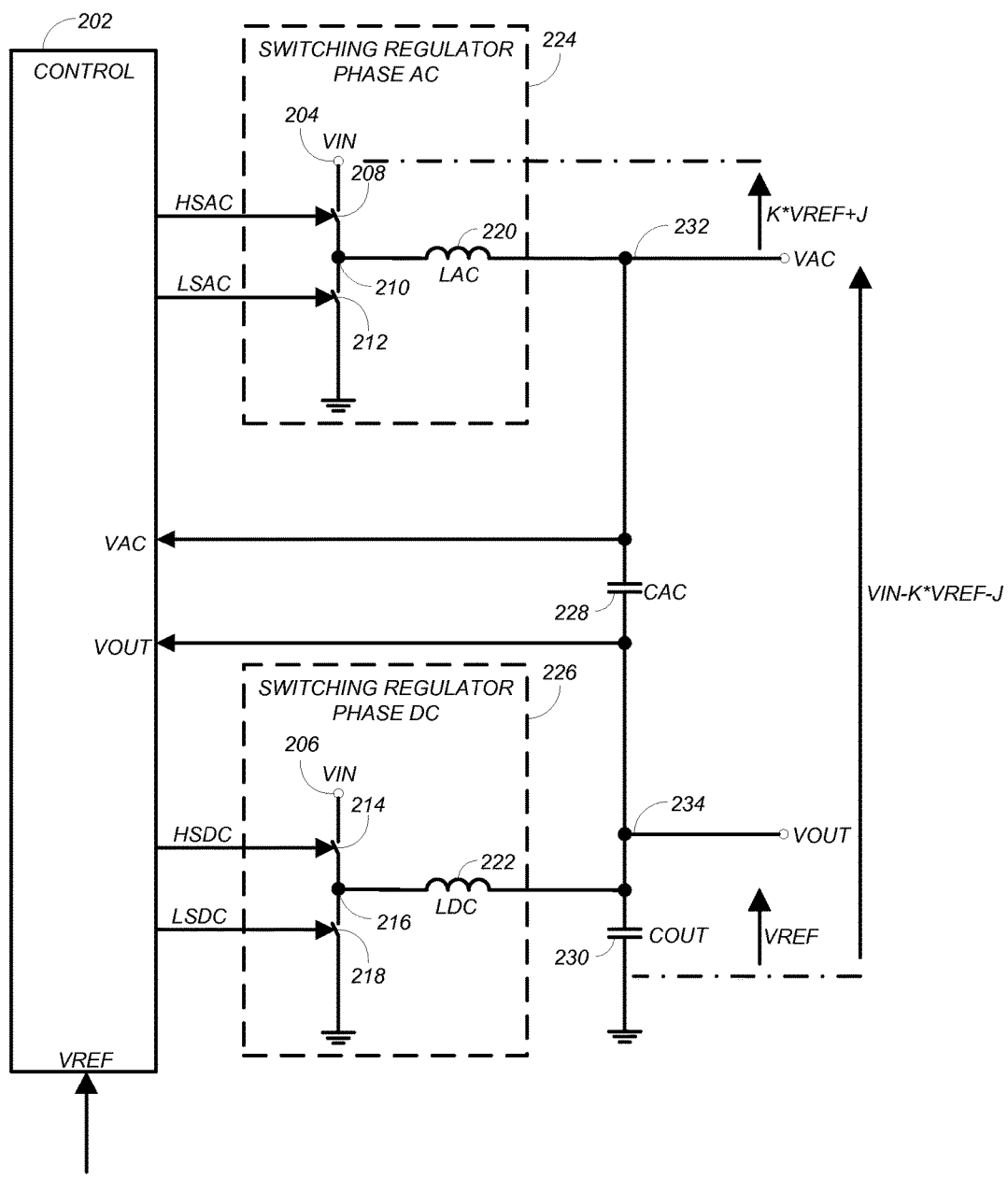
FIG. 3 illustrates a switching regulator including deadtime control according to one embodiment.

One example application of the above described technique is in a switching regulator with an AC stage (or phase) and a DC stage (or phase) as shown in FIG. 3. The operation of a switching regulator with AC and DC stages is described in commonly owned U.S. patent application Ser. No. 14/144,169, entitled "SWITCHING REGULATOR CIRCUITS AND METHODS," naming David Christian Gerard Tournatory and Kevin Kennedy Johnstone as inventors, the content of which is hereby incorporated herein by reference in its entirety. In some buck regulator applications, where Vin is greater than Vout, current is typically always positive. Thus, using both the charging and discharging techniques described above may not be practicable. However, in some embodiments, the AC stage may cancel the DC stage ripple at mid and high loads, and at light loads the DC stage may be shut down and the AC stage may be used to supply current to the load (e.g., without performing ripple cancellation) as described in commonly owned concurrently filed U.S. patent application Ser. No. 14/315,682, now issued as U.S. Pat. No. 9,577,532, entitled "SWITCHING REGULATOR CIRCUITS AND METHODS," naming David Christian Gerard Tournatory and Nicolas Stephane Monier, the content of which is hereby incorporated herein by reference in its entirety. In such cases, the inductor current may be both positive and negative.

Figure 4:
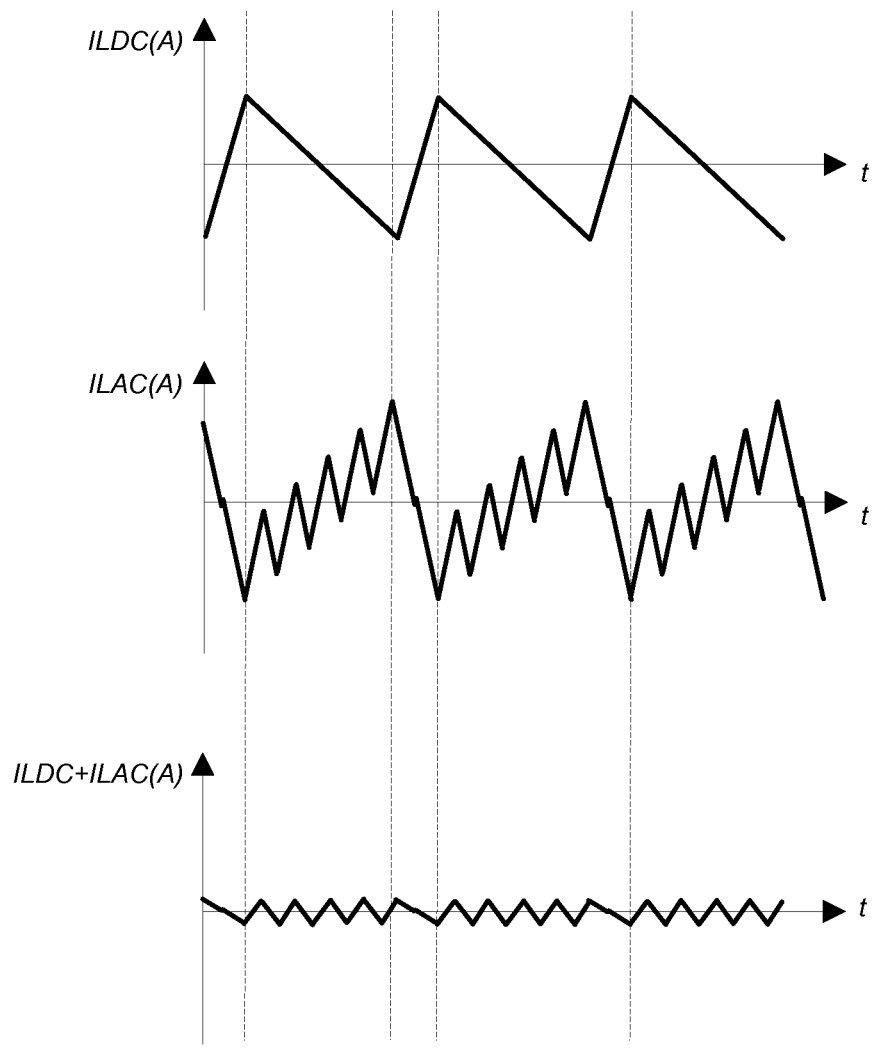
FIG. 4 illustrates waveforms for the switching regulator in FIG. 3 according to one embodiment.

FIG. 4 illustrates waveforms for the switching regulator in FIG. 3 according to one embodiment. In this example, the AC stage is used to actively cancel the ripple current of the DC stage. In this case, the AC stage does not support any load current and its inductor current is centered on zero and could be used to charge or discharge the output node of the AC stage during two transitions, for example. Accordingly, in some embodiments, the current in the AC stage, ILAC, may be both positive and negative. Therefore, some embodiments may include circuits to create a deadtime between a high side switch turning off and a low side switch turning on to discharge node SW using a positive inductor current down to zero volts and to create a deadtime between a low side switch turning off and a high side switch turning on to charge node SW using a negative inductor current up to Vin, for example.

Figure 5:
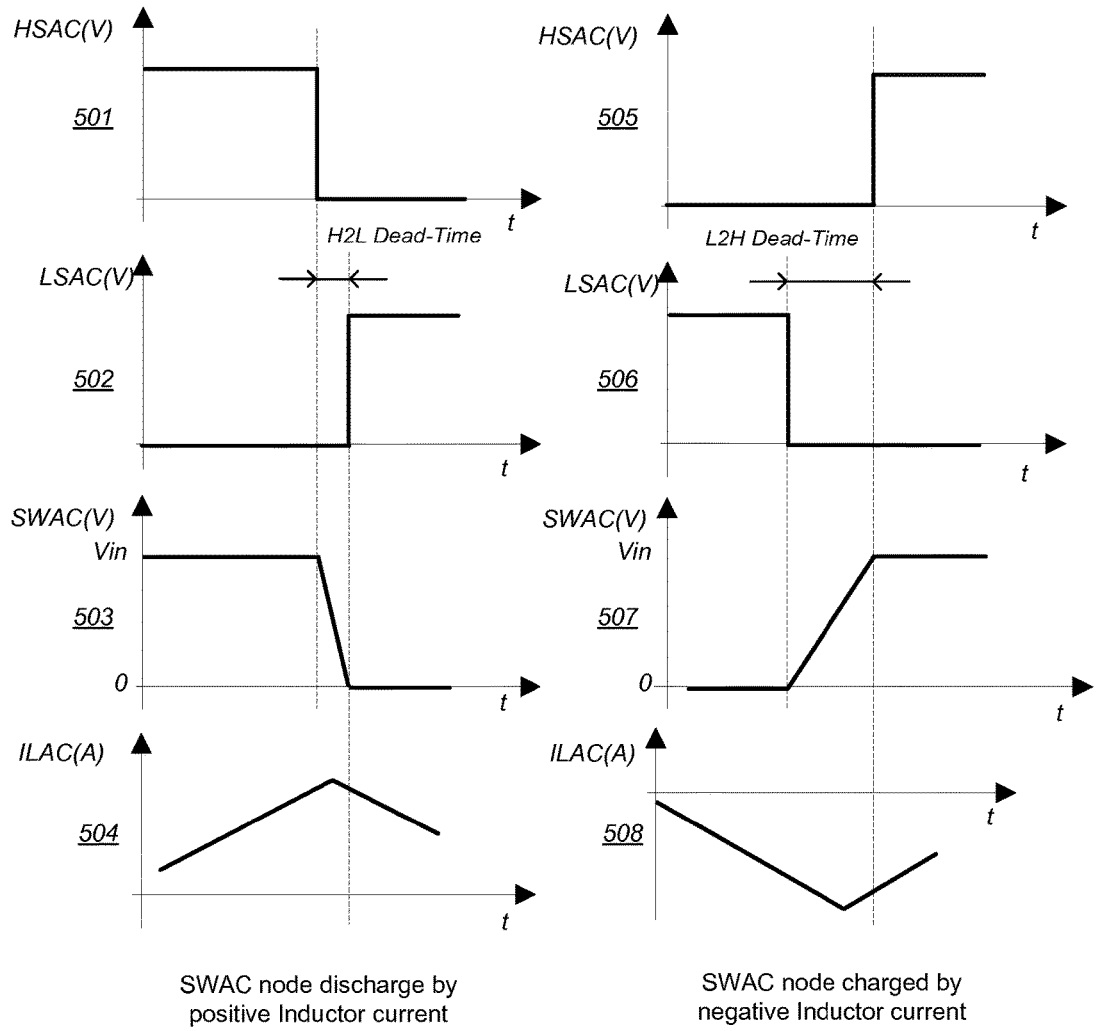
FIG. 5 illustrates additional waveforms for the switching regulator in FIG. 3 according to one embodiment.

FIG. 5 illustrates additional waveforms for the switching regulator in FIG. 3 according to one embodiment. When the inductor current is positive during a high to low transition of the SWAC node, the positive inductor current discharges the SWAC node to ground as shown at 501-504. On the other hand, when the inductor current is negative during a low to high transition of the SWAC node, the negative inductor current charges the SWAC node to VIN as shown at 505-508. FIG. 5 illustrates a high to low (H2L) deadtime to reduce SWAC from Vin to ground and a low to high (L2H) deadtime to increase SWAC from ground to Vin, which may improve the efficiency of the switching regulator, for example.

Figure 6:
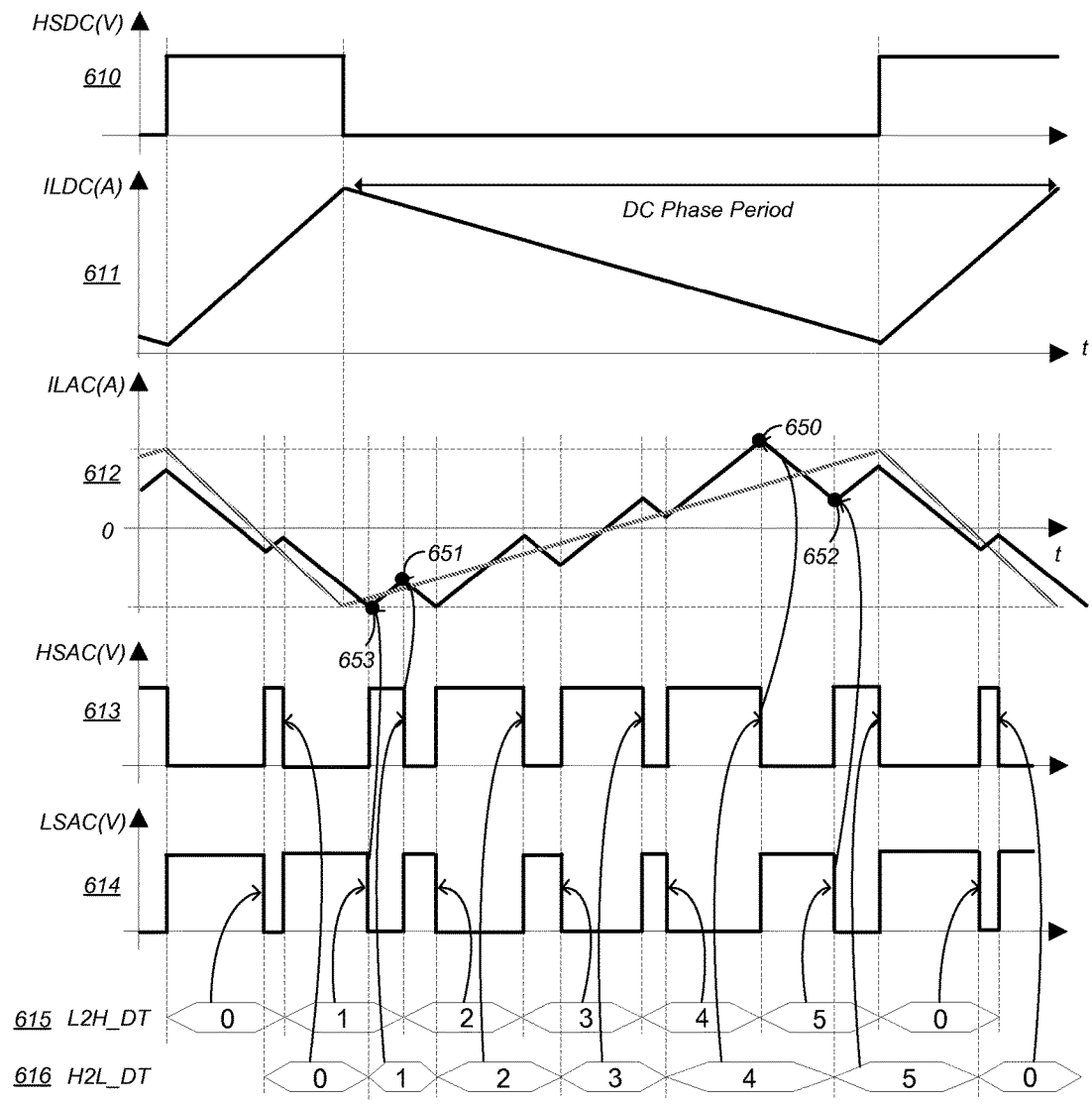
FIG. 6 illustrates additional waveforms for the switching regulator of FIG. 3 according to one embodiment.

FIG. 6 illustrates additional waveforms for the switching regulator of FIG. 3 according to one embodiment. In some example applications, an AC stage may not support DC current and may be centered on zero. This is illustrated in FIG. 6, which shows high side DC switching at 610, DC current over a DC period at 611, AC current over the DC period at 612, and HS and LS switching of the AC stage at 613 and 614, respectively. For example, during heavy or full load, the AC stage performs ripple cancellation where the inductor current may become both positive and negative. As illustrated in FIG. 6, inductor current ILAC may be different for different transitions across a full cycle. In this example, the inductor currents take on repetitive positive and negative values over multiple full cycles of the DC stage to cancel the DC ripple. Therefore, it is possible to predict, for each cycle, what the optimum deadtime should be for different HS/LS transitions. Prediction may occur via simulation or characterization, for example, and resulting parameters for setting different controlled time periods for particular transitions may be stored for use during operation. Thus, the PWM signal used to generate these repetitive currents also repeats after a full cycle of the DC stage. FIG. 6 illustrates a high side PWM drive signal HSAC 613 that repeats after the period of the DC stage in six (6) PWM periods every cycle, for example. Similarly, FIG. 6 illustrates a low side PWM drive signal LSAC 614 that repeats after a period of the DC stage in six (6) PWM periods every cycle, for example. Because the AC inductor current remains centered around zero regardless of the amount of current that the DC inductor carries, optimum deadtimes for each transition can be predicted over a cycle of the DC stage. The deadtimes may be stored and repeated over multiple cycles of the DC stage to optimize charge and discharge of the parasitic capacitance on the SWAC node. The cycling of the deadtime may be performed when the DC stage is active and the AC stage is used to cancel the current ripple of the DC stage, for example.

In one embodiment, predefined time periods (deadtimes) for high-to-low and low-to-high transitions may be stored, and cycled to produce a series of deadtime values (e.g., delays) to optimize the transitions. In the example shown in FIG. 6, a circuit is designed with 12 parameters that can be programmed at startup and adjusted individually to optimize the deadtime to reduce losses. The optimum values are stored and cycled. For instance, six (6) different deadtimes values may be cycled through for the low-to-high transitions (L2H_DT) as shown at 615. Similarly, six (6) different deadtimes values may be cycled through for the high-to-low transitions (H2L_DT) as shown at 616. The L2H_DT values may be active on falling edges of the LSAC signal (e.g., when the low side switch turns off and SW goes high), and the H2L_DT values may be active on falling edges of the HSAC signal (e.g., when the high side switch turns off and SW goes low). As illustrated in FIG. 6, different low-to-high transitions have corresponding deadtimes values and different high-to-low transitions have corresponding deadtimes values. In one example embodiment described in more detail below, the deadtime values are digital values used to program delays. From FIG. 6 four (4) scenarios can be seen: (1) H2L delay for positive inductor current 650 (delay>0), (2) H2L delay for negative inductor current 651 (delay close to, but greater than, zero to prevent shoot through current), (3) L2H delay for positive inductor current 652 (delay close to, but greater than, zero to prevent shoot through current), and (4) L2H delay for negative inductor current 653 (delay>0).

Figure 7:
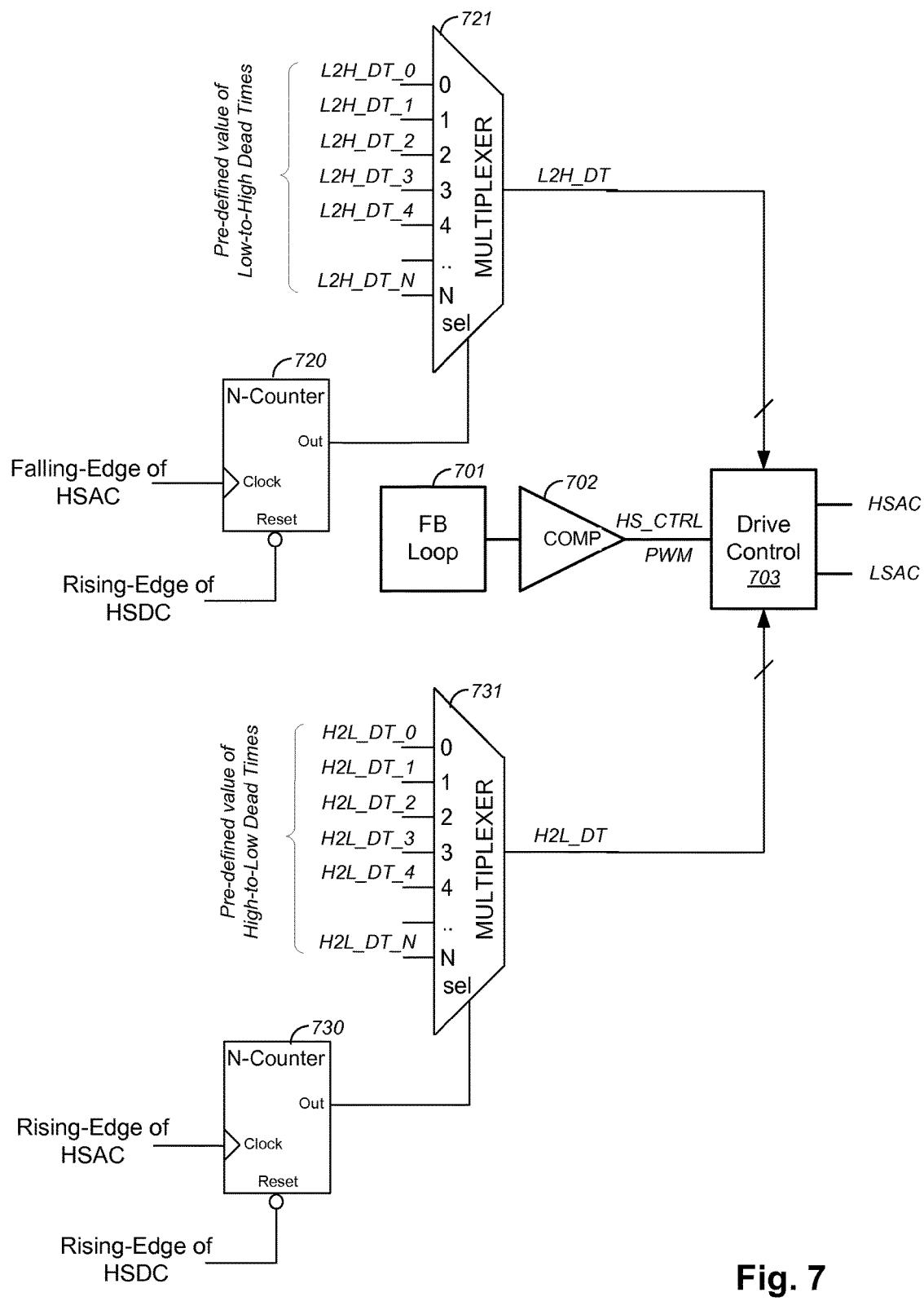
FIG. 7 illustrates an example circuit for controlling deadtime according to one embodiment.

FIG. 7 illustrates an example circuit for controlling deadtime according to one embodiment. In one embodiment, a switching regulator may include a feedback loop 701 (FB Loop) that drives a comparator 702 to produce a PWM signal. The PWM signal may be coupled through a drive control circuit 703 to generated high side HS and low side LS switching signals HSAC and LSAC, respectively, for example. The drive control circuit 703 may include programmable delays as described in more detail below. In this example, a first multiplexer (MUX) 721 receives N predefined values of low-to-high deadtimes, which may be used to control the programmable delays in the drive control 703. The deadtime values may be sequentially provided to the input of the drive control circuit 703 using a L2H_DT counter 720 that is clocked by a falling edge of the HSAC signal. The falling edge of the HSAC signal indicates when the high side switch turns off, corresponding to a high-to-low transition, which is a time the low-to-high deadtime is not needed and may be changed to the next value in the sequence. The L2H_DT counter 720 is reset using the rising edge of the high side DC stage, which indicates the restart of the sequence.

Similarly, a second multiplexer (MUX) 731 receives N other pre-defined values of high-to-low deadtimes, which may be used to control programmable delays in the drive control 703. The deadtime values may be sequentially provided to the input of the drive control circuit 703 using a H2L_DT counter 730 that is clocked by a rising edge of the HSAC signal. The rising edge of the HSAC signal indicates when the high side switch turns on, corresponding to a low-to-high transition, which is a time the high-to-low deadtime is not needed and may be changed to the next value in the sequence. The H2L_DT counter 730 is reset using the rising edge of the high side DC stage, which indicates the restart of the sequence. In one example implementation, 12 values of deadtime are provided using 4 bits each for H2L_DT and L2H_DT deadtime delays. Additionally, a sign bit may be used for negative deadtimes to cancel delays through the low side drivers that are longer than the high side drivers, for example.

Figure 8:
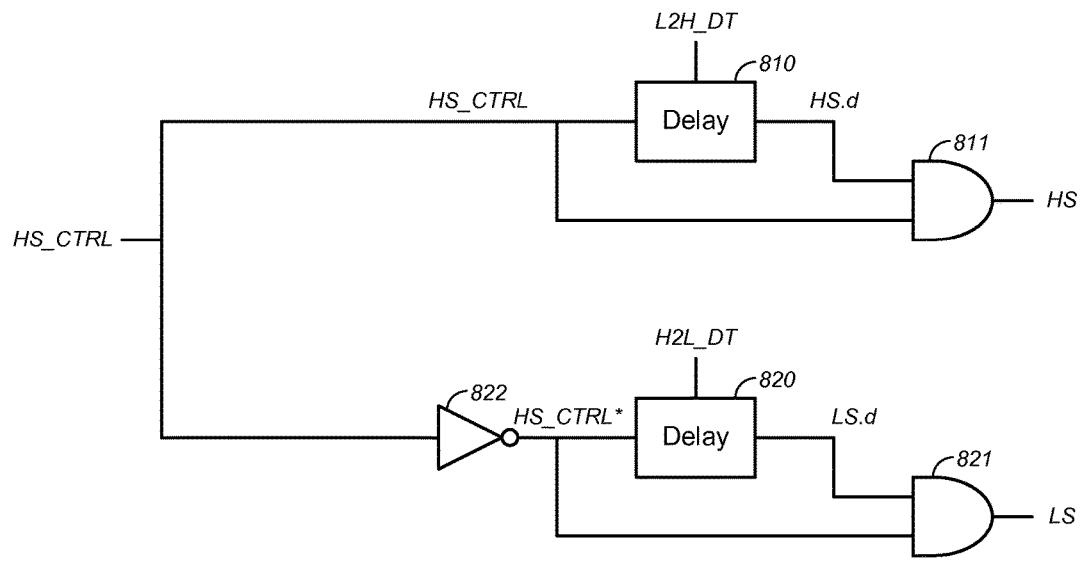
FIG. 8 illustrates a circuit for generating high side and low side drive signals according to one embodiment.

FIG. 8 illustrates a circuit for generating high side and low side drive signals according to one embodiment. The circuit in FIG. 8 is an example of a drive control circuit with programmable delay circuits for controlling low-to-high deadtime and high-to-low deadtime. In this example, PWM signal HS_CTRL is coupled through a high side channel to produce a high side drive signal HS and through a low side channel to produce a low side drive signal LS. High side channel includes a first programmable delay block 810 that receives L2H_DT, which delays the time the high side signal HS turns on, which causes a transition of node SW from low to high. In this example, HS_CTRL is coupled to one input of an AND gate 811. A delayed version of HS_CTRL (denoted, "HS.d") is coupled to another input of the AND gate 811. Thus, HS goes high only when HS_CTRL and HS.d are both received by the AND gate 811. As described above, L2H_DT comprise deadtime (or delay) values. Thus, L2H_DT may be used to control the delay between HS_CTRL and HS.d, which controls the timing of HS and the high side switch.

Similarly, low side channel includes an inverter 822 and a second programmable delay block 820 that receives H2L_DT, which delays the time the low side signal LS turns on, which causes a transition of node SW from high to low. In this example, HS_CTRL* (the inverse of HS_CTRL) is coupled to one input of an AND gate 821. A delayed version of HS_CTRL* (denoted, "LS.d") is coupled to another input of the AND gate 821. Thus, LS goes high only when HS_CTRL* and LS.d are both received by the AND gate 821. As described above, H2L_DT comprise deadtime (or delay) values. Thus, H2L_DT may be used to control the delay between HS_CTRL* and LS.d, which controls the timing of LS and the low side switch.

Figure 9:
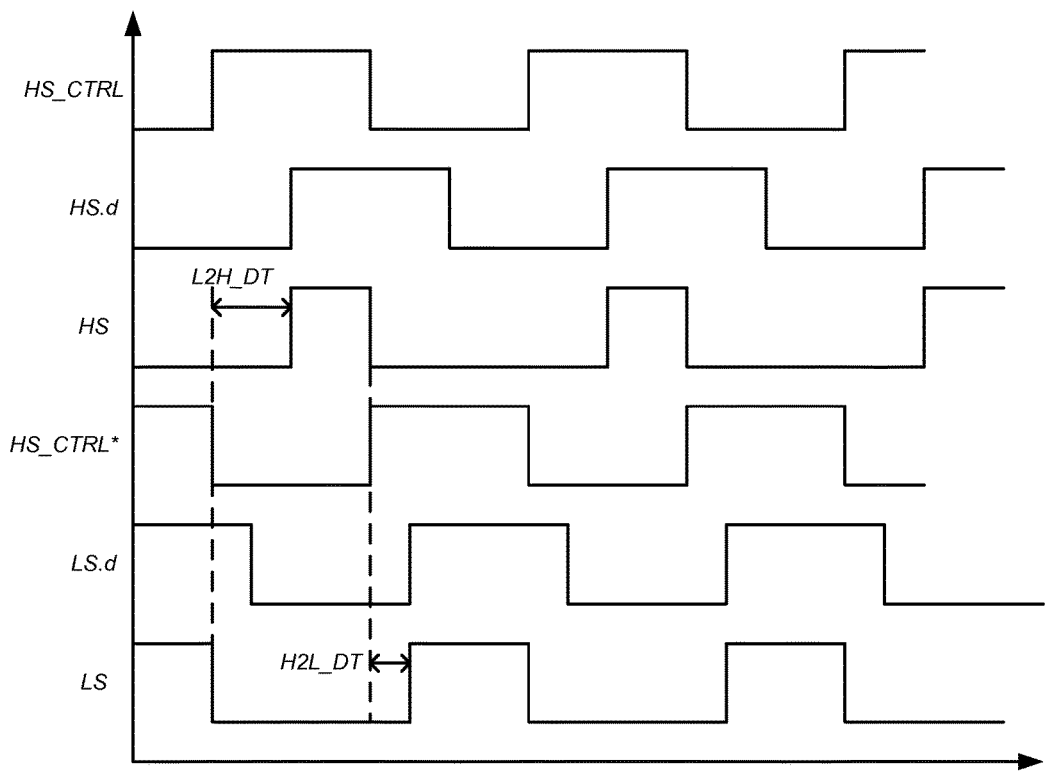
FIG. 9 illustrates waveforms for the circuit of FIG. 8 according to one embodiment.

FIG. 9 illustrates waveforms for the circuit of FIG. 8 according to one embodiment. As illustrated in FIG. 9, the time delay between a falling edge of LS (low side switch turning off) and the rising edge of HS (high side switch turning on)—i.e., a low to high transition—is controlled by a programmable value of L2H_DT. Similarly, the time delay between a falling edge of HS (high side switch turning off) and the rising edge of LS (low side switch turning on)—i.e., a high to low transition—is controlled by a programmable value of H2L_DT.

Figure 10:
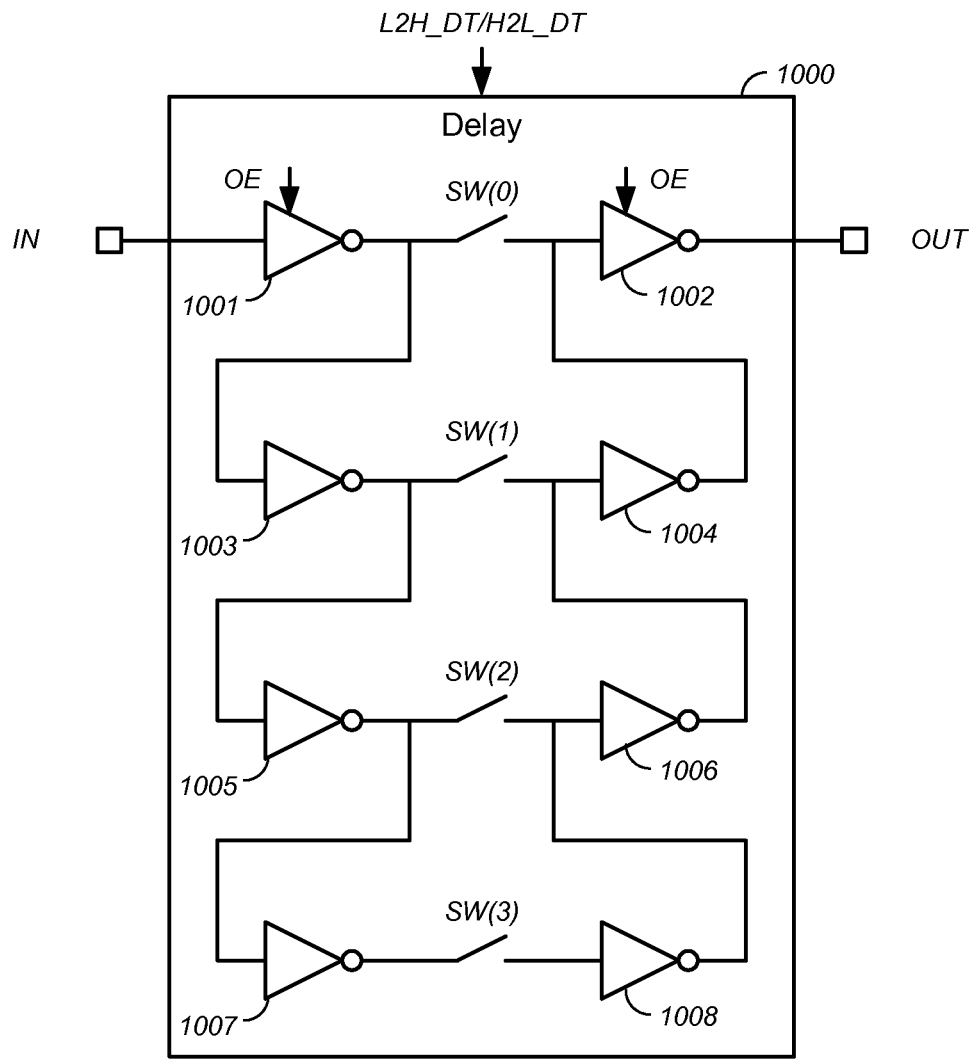
FIG. 10 illustrates an example programmable delay circuit according to one embodiment.

FIG. 10 illustrates an example programmable delay circuit according to one embodiment. In this example, inverters 1001-1008 are used as delay elements. The inverters are configured as shown. Switches SW(0-3) may be configured to increase or decrease the delay. For example, a minimum delay may be to close SW(0) and open all other switches. An incrementally longer delay may be obtain by closing SW(1) and opening all other switches. The number of inverters in the signal path, and the corresponding delay, may be increase accordingly. More delay may improve efficiency because the circuit is using current in the inductor to charge the SW node, and charge on the SW node is not. Short delay produces lower deadtimes, and the circuit only uses exactly what is needed in the delay circuit. For example, lower delay uses less inverters and less power.

Figure 11:
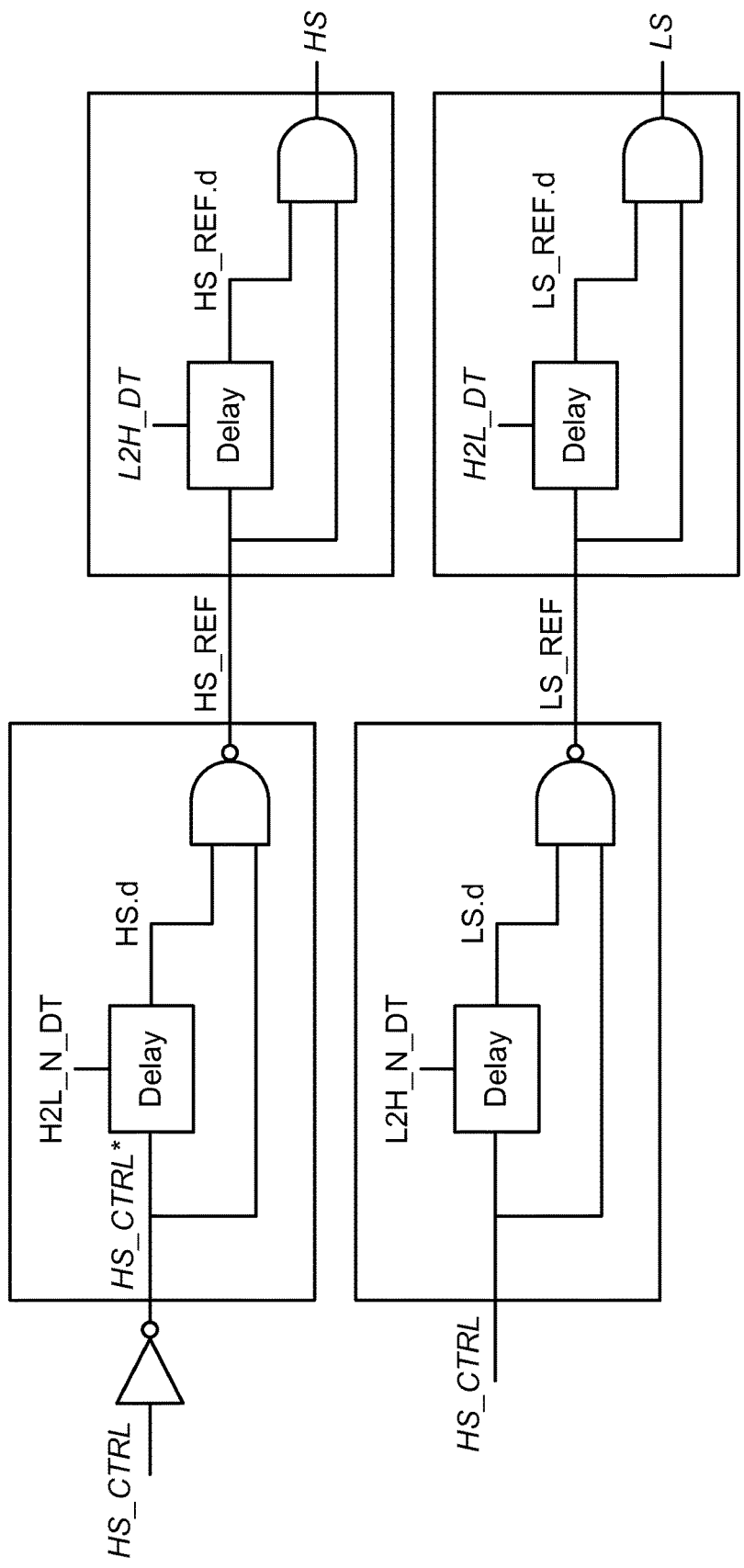
FIG. 11 shows an example circuit for controlling positive and negative (overlap) deadtimes, including additional programmable delay elements to control negative deadtime.
Figure 12:
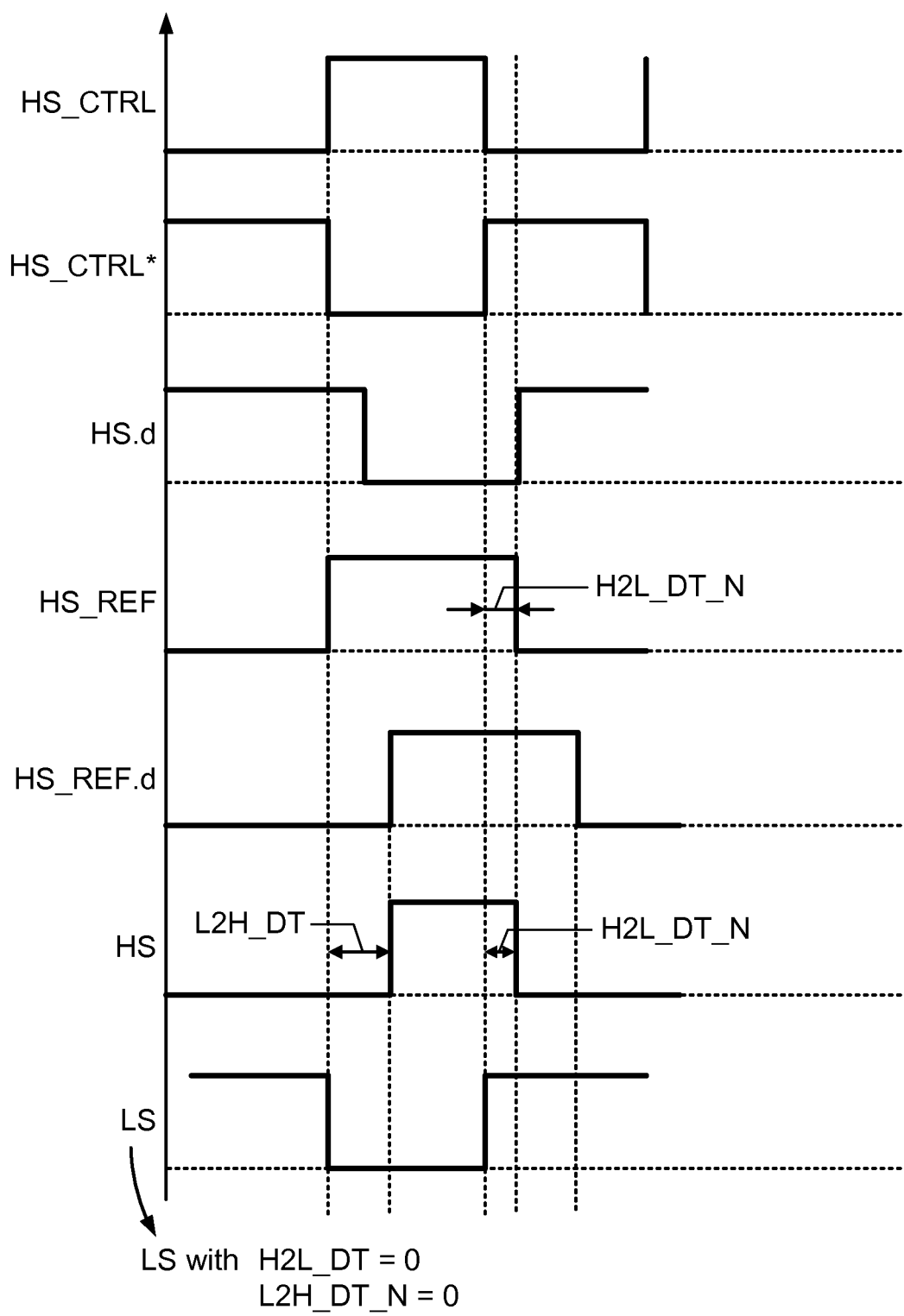
FIG. 12 illustrates waveforms for negative deadtime.

FIG. 11 shows an example circuit for controlling positive and negative (overlap) deadtimes, including additional programmable delay elements to control negative deadtime. To create a negative (or overlap) H2L Dead Time, delay H2L_DT is equal to zero (H2L_DT=0) and delay H2L_N_DT is not equal to zero (H2L_N_DT!=0). To create a negative (or overlap) L2H Dead Time, delay L2H_DT=0 and delay L2H_N_DT !=0. FIG. 12 illustrates waveforms for negative deadtime. The circuits above may provide both positive and negative delay control to configure the edges to maximum efficiency, for example.

Further Example Embodiments

Different embodiments and example implementations of the present disclosure may take a variety for forms. In one embodiment the present disclosure includes a method comprising turning off a first switch in a switching regulator, turning on a second switch in the switching regulator after the first switch is turned off, wherein the second switch is turned on after a controlled time period, wherein a current in an inductor changes a voltage on a node between a first terminal of the first switch and a first terminal of the second switch, and wherein the controlled time period is configured so that the voltage on the node between the first switch and the second switch is approximately equal to a voltage on a second terminal of the second switch after the controlled time period when the second switch is turned on.

In one embodiment, the present disclosure includes a switching regulator circuit comprising a first switch having a first terminal coupled to a first voltage and a second terminal coupled to a switching node, a second switch having a first terminal coupled to the switching node and a second terminal coupled to a second voltage, an inductor having a first terminal coupled to the switching node and a second terminal coupled to a switching regulator output node, and drive circuitry to produce a first signal to turn the first switch on and off and to produce a second signal to turn the second switch on and off, wherein the second switch is turned on after first switch is turned off, wherein a time period between the first switch turning off and the second switch turning on is a controlled time period, wherein a current in the inductor changes a voltage on the switching node, and wherein the controlled time period is configured so that the voltage on the switching node is approximately equal to a voltage on the second terminal of the second switch after the controlled time period when the second switch is turned on.

In one embodiment, the switching regulator circuit further comprises a programmable delay circuit to produce the controlled time period.

In one embodiment, the switching regulator comprises an AC stage and a DC stage, the AC stage comprising the first switch and the second switch, and wherein in a first mode of operation the AC stage cancels ripple in the DC stage, and further comprising a plurality of controlled time periods over a period of the DC stage, wherein different controlled time periods correspond to different inductor currents in the AC stage during a plurality of transitions.

In one embodiment, a first plurality of controlled time periods correspond to different inductor currents in the AC stage during a first plurality of high to low transitions of a switching node in the AC stage, and wherein a second plurality of controlled time periods correspond to different inductor currents in the AC stage during a second plurality of low to high transitions of the switching node in the AC stage.

In one embodiment, the first plurality of controlled time periods are configured during low to high transitions, and wherein the second plurality of controlled time periods are configured during high to low transitions.

In one embodiment, the plurality of time periods repeat over a plurality of periods of the DC stage.

In one embodiment, the plurality of time periods are stored as a plurality of digital values.

In one embodiment, the plurality of digital values are used to program a plurality of delays.

In one embodiment, the first switch and the second switch are MOS transistors.

In one embodiment, the first switch is a high side switch and the second switch is a low side switch, and wherein the current in the inductor reduces the voltage on the node.

In one embodiment, the first switch is a low side switch and the second switch is a high side switch, and wherein the current in the inductor increases the voltage on the node.

In one embodiment, the present disclosure includes a method comprising turning off a first switch in a switching regulator, turning on a second switch in the switching regulator after the first switch is turned off, wherein the second switch is turned on after a controlled time period, wherein a current in an inductor changes a voltage on a node between a first terminal of the first switch and a first terminal of the second switch, and wherein the controlled time period is configured so that the voltage on the node between the first switch and the second switch is approximately equal to a voltage on a second terminal of the second switch after the controlled time period when the second switch is turned on.

In one embodiment, the switching regulator comprises an AC stage and a DC stage, the AC stage comprising said first switch and second switch, and wherein the controlled time period comprises a plurality of time periods over a period of the DC stage.

In another embodiment, the plurality of controlled time periods repeat over each period of the DC stage.

In another embodiment, the first switch and second switch are MOS transistors.

In another embodiment, the present disclosure includes a circuit comprising a switching regulator comprising a first switch, a second switch, and an inductor, drive circuitry to produce a first signal to turn the first switch on and off and to produce a second signal to turn the second switch on and off, and a programmable delay circuit to produce a controlled time period. The second switch is turned on after the first switch is turned off and the second switch is turned on after a controlled time period. A current in the inductor changes a voltage on a node between a first terminal of the first switch and a first terminal of the second switch, and the controlled time period is configured so that the voltage on the node between the first switch and the second switch is approximately equal to a voltage on a second terminal of the second switch after the controlled time period when the second switch is turned on.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method, comprising:

turning off a first switch in a first stage of a switching regulator, the switching regulator further comprising a second stage in parallel with the first stage, wherein each of the first and second stages of the switching regulator comprises a buck configuration regulator stage;

turning on a second switch in the first stage of the switching regulator after the first switch is turned off, wherein the second switch is turned on after one of a plurality of controlled time periods, wherein a current in an inductor changes a voltage on a node between a first terminal of the first switch and a first terminal of the second switch, and wherein the controlled time periods are configured according to different output currents so that the voltage on the node between the first switch and the second switch is equal to a voltage on a second terminal of the second switch after each controlled time period when the second switch is turned on.

2. The method of claim 1, wherein in a first mode of operation the first stage cancels ripple in the second stage, and wherein the plurality of controlled time periods occur over a period of the second stage, wherein different controlled time periods correspond to different inductor currents in the first stage during a plurality of transitions.

3. The method of claim 1, wherein a first plurality of controlled time periods correspond to different inductor currents in the first stage during a first plurality of high to low transitions of a switching node in the first stage, and wherein a second plurality of controlled time periods correspond to different inductor currents in the first stage during a second plurality of low to high transitions of the switching node in the first stage.

4. The method of claim 3, wherein the first plurality of controlled time periods are configured during low to high transitions, and wherein the second plurality of controlled time periods are configured during high to low transitions.

5. The method of claim 1, wherein the plurality of controlled time periods repeat over a plurality of periods of the second stage.

6. The method of claim 1, wherein the plurality of controlled time periods are stored as a plurality of digital values.

7. The method of claim 1, wherein the first switch and the second switch are MOS transistors.

8. The method of claim 1, wherein the first switch is a high side switch and the second switch is a low side switch, and wherein the current in the inductor reduces the voltage on the node.

9. The method of claim 1, wherein the first switch is a low side switch and the second switch is a high side switch, and wherein the current in the inductor increases the voltage on the node.

10. A switching regulator circuit, comprising:

a first stage and a second stage in parallel, wherein each of the first and second stages of the switching regulator comprises a buck configuration regulator stage, the first stage comprising:

a first switch having a first terminal coupled to a first voltage and a second terminal coupled to a switching node;

a second switch having a first terminal coupled to the switching node and a second terminal coupled to a second voltage;

an inductor having a first terminal coupled to the switching node and a second terminal coupled to a switching regulator output node; and drive circuitry to produce a first signal to turn the first switch on and off and to produce a second signal to turn the second switch on and off, wherein the second switch is turned on after first switch is turned off, wherein a time period between the first switch turning off and the second switch turning on is one of a plurality of controlled time periods, wherein a current in the inductor changes a voltage on the switching node, and wherein the controlled time periods are configured according to different output currents so that the voltage on the switching node is equal to a voltage on the second terminal of the second switch after the controlled time period when the second switch is turned on.

11. The switching regulator circuit of claim 10, further comprising a programmable delay circuit to produce the controlled time period.

12. The switching regulator circuit of claim 10, wherein in a first mode of operation the first stage cancels ripple in the second stage, and wherein different controlled time periods correspond to different inductor currents in the first stage during a plurality of transitions.

13. The switching regulator circuit of claim 10, wherein a first plurality of controlled time periods correspond to different inductor currents in the first stage during a first plurality of high to low transitions of the switching node in the first stage, and wherein a second plurality of controlled time periods correspond to different inductor currents in the first stage during a second plurality of low to high transitions of the switching node in the first stage.

14. The switching regulator circuit of claim 13, wherein the first plurality of controlled time periods are configured during low to high transitions, and wherein the second plurality of controlled time periods are configured during high to low transitions.

15. The switching regulator circuit of claim 10, wherein the plurality of controlled time periods repeat over a plurality of periods of the second stage.

16. The switching regulator circuit of claim 10, wherein the plurality of controlled time periods are stored as a plurality of digital values.

17. The switching regulator circuit of claim 10, wherein the first switch and the second switch are MOS transistors.

18. The switching regulator circuit of claim 10, wherein the first switch is a high side switch and the second switch is a low side switch, and wherein the current in the inductor reduces the voltage on the node.

19. The switching regulator circuit of claim 10, wherein the first switch is a low side switch and the second switch is a high side switch, and wherein the current in the inductor increases the voltage on the node.

* * * * *